United States Patent [19]

Graf et al.

[11] Patent Number: 5,563,240

[45] Date of Patent: Oct. 8, 1996

[54] POLY [2,5-BIS(POLYSULPHANO)-1,3,4-THIADIAZOLES]

[75] Inventors: Hans-Joachim Graf, Mannheim; Volker Schäfer, Altrip; Kurt Schilling, Schwetzingen; Clemens Schudok, Bobenheim-Roxheim, all of Germany

[73] Assignee: Rhein Chemie Rheinau GmbH, Mannheim, Germany

[21] Appl. No.: 496,313

[22] Filed: Jun. 29, 1995

[30] Foreign Application Priority Data

Jul. 13, 1994 [DE] Germany .............. 44 24 680.3

[51] Int. Cl.$^6$ ........................ C08G 75/32
[52] U.S. Cl. ........................ 528/377; 528/381
[58] Field of Search ...................... 528/377, 381

[56] References Cited

U.S. PATENT DOCUMENTS 4,772,638  9/1988  Marriott et al. .............. 523/179
5,247,061  9/1993  Zisman et al. ............... 528/374
5,250,625  10/1993  Ehrend ....................... 525/182
5,262,488  11/1993  Maly et al. .................. 525/282
5,391,621  2/1995  Ohm et al. ................... 525/349

FOREIGN PATENT DOCUMENTS 0455030  11/1991  European Pat. Off. .
0584755  3/1994   European Pat. Off. .

Primary Examiner—Mark D. Sweet
Attorney, Agent, or Firm—Connolly & Hutz

[57] ABSTRACT

Poly[2,5-bis(polysulphano)-1,3,4-thiadiazoles] of the formula

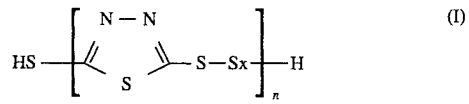

wherein
  X signifies a number from 1 to 10 and
  n signifies a number from 2 to 1,000.

3 Claims, No Drawings

POLY [2,5-BIS(POLYSULPHANO)-1,3,4-THIADIAZOLES]

The present invention provides poly[2,5-bis(polysulphano)-1,3,4-thiadiazoles] and a method for the preparation thereof. The thiadiazoles according to the invention have the formula

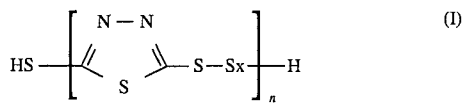

wherein

X signifies a number from 1 to 10, preferably 1 to 3 and
n signifies a number from 2 to 1,000, preferably 2 to 100 and particularly from 4 to 50.

The said polymeric thiadiazoles are solid substances having melting points in the range of from 100° to 200° C. They are generally yellow in colour.

The thiadiazoles of formula (I) can be prepared by reacting 2,5-dimercapto-1,3,4-thiadiazole with a dichloropolysulphane. The reaction is generally conducted at temperatures of from 0° to 100° C., preferably from 20° to 50° C., in a strongly alkaline aqueous medium. The two starting materials are generally used in approximately equimolar quantities; an excess of one of the two components is, of course, possible. Both starting materials are generally soluble in the reaction medium; the polymer obtained is insoluble. The latter therefore precipitates out during the reaction and can easily be separated.

The reaction can be represented by means of the following reaction equation:

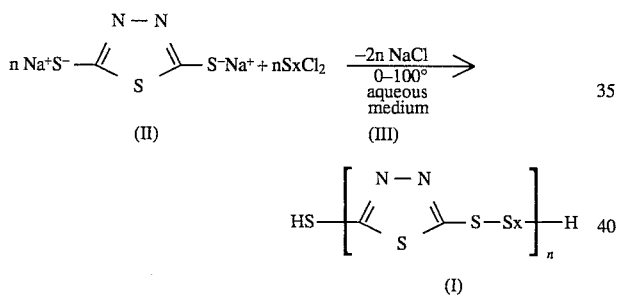

2,5-dimercapto-1,3,4-thiadiazole (II) is known, as are the dichloropolysulphanes. $S_2Cl_2$ is commercially available and dichloropolysulphanes having a higher sulphur content are prepared therefrom by heating with elemental sulphur.

To prepare the poly[2,5-bis(polysulphano)-1,3,4-thiadiazoles] according to the invention, 2,5-dimercapto-1,3,4-thiadiazole can first of all be dissolved in water or in a solvent mixture containing predominantly water, for example, a mixture of water and alcohols in the presence of a strong base, for example, sodium hydroxide solution. The salt of the formula (II) given above is formed when the base is NaOH. The dichloropolysulphane is then added in the appropriate quantity and the mixture is optionally warmed. The polymerisation reaction is exothermic, so that if necessary cooling must be carried out during the reaction. The polymer formed of formula (I) is insoluble in the reaction medium; it precipitates out and can be isolated directly.

Particular dimeric derivatives of 2-mercapto-1,3,4-thiadiazole are described in the British Patent Specification 959 182. Here also alkaline solutions of 2-mercapto-1,3,4-thiadiazole are a starting material, however other coreactants are used.

The poly[2,5-bis(polysulphano)-1,3,4-thiadiazoles] according to the invention can be employed for the vulcanisation of sulphur-free polychloroprenes. The preferred vulcanisation system used for this contains thiophosphate in addition to the compound of formula (I). Using this combination, vulcanisates are obtained having properties corresponding to those achieved with the best vulcanisation systems currently available.

EXAMPLE 1

75 g (0.5 mol) of 2,5-dimercapto-1,3,4-thiadiazole is added in portions, with cooling in ice and stirring, and to a solution of 40 g (1 mol) of NaOH in 280 ml of water. Under these conditions no warmth is retained and a dark solution is formed. To this solution 67.5 g (0.5 mol) of disulphur dichloride is added dropwise, without previous working up, over approx. 40 min, while the temperature is maintained at between 10° and 30° C. by cooling with ice water. When addition is complete, stirring is continued for one hour at room temperature and the product, which is insoluble in water, is filtered off. The yellow solid is washed with water and dried in a vacuum at approx. 80° C.

Yield: approx. 95 g (corresponding to approx. 90% of theoretical, referred to 2,5-dimercapto-1,3,4-thiadiazole), melting point 146°–168° C.

$(C_2N_2S_5)_n$: calculated: C 11.3% H 0.00% N 13.2%, S 75.2%, Cl 10.0%

EXAMPLE 2

To the aqueous solution of the disodium salt of 2,5-dimercapto-1,3,4-thiadiazole, prepared as in Example 1, 83.5 g (0.5 mol) of $S_3Cl_2$ (prepared from 67.5 g of $S_2Cl_2$ and 16 g of sulphur) is added dropwise over approx. 1 hour, while the temperature is maintained at between 10° and 30° C. by cooling with ice water. When addition is complete, stirring is continued for one hour at room temperature and the product, which is insoluble in water, is filtered off. The yellow solid is washed with water and dried in a vacuum at approx. 80° C.

Yield: approx. 108 g (corresponding to approx. 90% of theoretical, referred to 2,5-dimercapto-1,3,4-thiadiazole), melting point 133°–148° C.

$(C_2N_2S_6)_x$: calculated: C 9.8%, H 0.00%, N 11.5%, S 78.7%, Cl 0.0% given: C 10.0%, H 0.5%, N 11.1%, S 76.6%, Cl 0.16%

EXAMPLE 3

Vulcanisation of sulphur- free polychloroprene:

The following rubber mixtures were prepared (numerical data in the Table are parts by weight):

TABLE I

| | Composition | | | | | | |
|---|---|---|---|---|---|---|---|
| | A | B | C | D | E | F | G |
| Polychloroprene | 100 | 100 | 100 | 100 | 100 | 100 | 100 |
| Magnesium oxide | 2 | 2 | 2 | 2 | 2 | 2 | 2 |
| Octylated diphenylamine | 2 | 2 | 2 | 2 | 2 | 2 | 2 |
| Pentaerythritol bis-tetrahydrobenzaldehyde acetal | 1 | 1 | 1 | 1 | 1 | 1 | 1 |
| Stearic acid | 0.5 | 0.5 | 0.5 | 0.5 | 0.5 | 0.5 | 0.5 |
| Antiozonant wax | 2 | 2 | 2 | 2 | 2 | 2 | 2 |
| Polyethylene wax | 3 | 3 | 3 | 3 | 3 | 3 | 3 |
| Carbon black | 20 | 20 | 20 | 20 | 20 | 20 | 20 |

TABLE I-continued

| | Composition | | | | | | |
|---|---|---|---|---|---|---|---|
| | A | B | C | D | E | F | G |
| N550 Carbon black N330 | 10 | 10 | 10 | 10 | 10 | 10 | 10 |
| Durex O (carbon black) | 15 | 15 | 15 | 15 | 15 | 15 | 15 |
| Dioctyl sebacate | 5 | 5 | 5 | 5 | 5 | 5 | 5 |
| Highly aromatic plasticising oil | 15 | 15 | 15 | 15 | 15 | 15 | 15 |
| Calcium oxide | 6 | 6 | 6 | 6 | 6 | 6 | 6 |
| ZnO | 6 | 6 | 6 | 6 | 6 | 6 | 6 |
| Dialkyldithio-phosphorylamine salt | 1 | 1 | 2 | — | — | — | — |
| Poly-[2,5-bis(polysulphono)]-1,3,4-thiadiazole | 0.9 | 2.7 | 0.9 | 2.7 | 1.8 | 1.8 | — |
| Dialkyldithio-phosphorylamine salt | — | — | — | — | 1 | 2 | — |
| Diethylurea | — | — | — | — | — | — | 1.25 |

Moulded bodies made from a mixture were vulcanised at 170° C. for 10 minutes and the following values were measured:

TABLE 2

| | A | B | C | D | E | F | G |
|---|---|---|---|---|---|---|---|
| Density (g/mm³) | 1.33 | | | | | | |
| Hardness (Shore A) | 57 | 65 | 57 | 65 | 61 | 57 | 59 |
| Elasticity (%) | 44 | 48 | 44 | 49 | 45 | 45 | 49 |
| Tear strength | 19.2 | 14.8 | 19.2 | 14.9 | 17.9 | 20.1 | 14.1 |
| Modulus 100 (MPa) | 2.2 | 3.2 | 2.2 | 3.5 | 2.7 | 2.4 | 3.5 |
| Modulus 300 (MPa) | 10 | 10 | 9.1 | 11.1 | 9.8 | 8.8 | — |
| Tensile strength (MPa) | 14.2 | 12.3 | 12.9 | 11 | 12.6 | 12.1 | 10.3 |
| Elongation (%) | 430 | 370 | 430 | 300 | 400 | 415 | 265 |

After storage in hot air at 100° C. for 7 days:

TABLE 3

| | A | B | C | D | E | F | G |
|---|---|---|---|---|---|---|---|
| Hardness (Shore A) (°ShA) | 63 | 71 | 62 | 70 | 66 | 64 | 62 |
| Elasticity (%) | 45 | 48 | 45 | 47 | 46 | 46 | 53 |
| Tear strength (N/mm) | 19.8 | 15 | 19.7 | 16.0 | 16.6 | 19.1 | 14.5 |
| Modulus 100 (MPa) | 3.1 | 5 | 5 | 4.9 | 3.9 | 3.6 | 2.7 |
| Modulus 300 (MPa) | 11 | — | — | — | — | — | 9.7 |
| Tensile strength (MPa) | 12.1 | 9.6 | 10.8 | 9.2 | 8.9 | 10.4 | 10.8 |
| Elongation (%) | 335 | 205 | 300 | 200 | 225 | 280 | 335 |

We claim:

1. Poly[2,5-bis(polysulphano)-1,3,4-thiadiazoles] of the formula

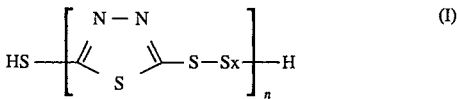

wherein

X signifies a number from 2 to 10 and n signifies a number from 2 to 1,000.

2. Method for the preparation of the polythiadiazoles of formula (I) of claim 1, characterised in that 2,5-dimercapto-1,3,4-thiadiazole is reacted in a strongly alkaline aqueous medium with dichloropolysulphane at temperatures of from 0° to 100° C.

3. A method of using the polythiadiazoles of formula (I) of claim 1, wherein said polythiadiazoles are added to a mixture containing sulphur-free polychloroprene as a vulcanising agent for the vulcanisation of said sulphur-free polychloroprene.

* * * * *

UNITED STATES PATENT AND TRADEMARK OFFICE
CERTIFICATE OF CORRECTION

PATENT NO. : 5,563,240
DATED : October 8, 1996
INVENTOR(S) : Graf et al

It is certified that error appears in the above-indentified patent and that said Letters Patent is hereby corrected as shown below:

On the title page of the patent, in the References Cited section [56], insert the following subsection:

Abstract of JP-A-61238838, Patent Abstracts of Japan, Vol. 11, No. 85 (10/24/86).--

Signed and Sealed this

Seventh Day of January, 1997

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,563,240

DATED : October 8, 1996

INVENTOR(S) : Graf et al

It is certified that error appears in the above-identified patent and that said Letters Patent is hereby corrected as shown below:

On the title page of the patent, in the References Cited section [56], insert the following subsection:

--OTHER PUBLICATIONS

Abstract of JP-A-61238838, Patent Abstracts of Japan, Vol. 11, No. 85 (10/24/86).--

This certificate supersedes Certificates of Correction issued January 07, 1997.

Signed and Sealed this

Twenty-third Day of December, 1997

Attest:

BRUCE LEHMAN

*Attesting Officer*   *Commissioner of Patents and Trademarks*